United States Patent
Beery et al.

[15] 3,659,524
[45] May 2, 1972

[54] PRINTER CONTROL SYSTEM

[72] Inventors: Jack Beery, Farminton; William B. Templeton, Howell, both of Mich.

[73] Assignee: Burroughs Corporation, Detroit, Mich.

[22] Filed: Oct. 15, 1970

[21] Appl. No.: 80,959

[52] U.S. Cl. ..........................................101/93 MN, 101/235
[51] Int. Cl. ........................................B41j 9/10, B41f 13/24
[58] Field of Search ....................101/93 A, 93 MN, 93 C, 91, 101/233, 234, 235, 239

[56] References Cited

UNITED STATES PATENTS

| | | | |
|---|---|---|---|
| 3,217,639 | 11/1965 | Kelly | 101/233 |
| 3,191,526 | 6/1965 | Ross | 101/91 |
| 3,335,661 | 8/1967 | Moschetti et al. | 101/235 |
| 3,373,685 | 3/1968 | Adams | 101/235 |
| 3,573,589 | 4/1971 | Berry | 318/601 |

*Primary Examiner*—William B. Penn
*Attorney*—Kenneth L. Miller and Edwin W. Uren

[57] ABSTRACT

In a document printing machine comprising a plurality of interconnected modular sections, there is disclosed herein a printer module having a self container control system. Documents, to be printed upon, are sequentially passed through the printer module under the control and drive of either one of two different speed drive units. The second drive unit initially functions as a control gate to control the feeding of documents into the printer module. When the printing operation is to begin, the second drive unit moves the documents through the printer module at a positively controlled printing speed. After the printing operation, the first drive unit moves the documents out of the printer module at a high speed.

In order to maintain the correct character pitch between adjacent serially printed characters, a timing unit is operatively connected to the first drive unit. This timing unit is responsive to drive variations and accurately divides each character pitch into a plurality of intervals. Each interval controls one or more printer operation functions including the actual print operation. In order to maintain the synchronism between the movement of the documents and the character pitch, the second drive unit is clutched from the first drive unit.

11 Claims, 15 Drawing Figures

Patented May 2, 1972

INVENTORS
JACK BEERY
WILLIAM B. TEMPLETON
BY *Russel C Wells*
ATTORNEY

Patented May 2, 1972 3,659,524

Patented May 2, 1972

PRINTER CONTROL SYSTEM

BACKGROUND OF INVENTION

This invention relates to document printing machines in general and to synchronizing control systems controlling the operation of the printing mechanism.

In the fields of OCR and MICR encoding, the printing requirement as to quality of print is very high. The document to be encoded must be accurately positioned with respect to the print hammer, print wheel and the preceding character in order to maintain the proper character pitch. Between successive character prints, the printing mechanism must be positioned to the next character and the hammer striking time must be initiated at the proper time relative to the character pitch.

Previously the timing mechanism for controlling actual hammer fire were asynchronuous to the document travel or at best were initiated in dependence upon the previous print operation. Both of these timing mechanisms failed to accurately maintain the character pitch if the document drive speed was significantly changed between successive characters. Such changes can occur as a result of line voltage and frequency changes.

It is therefore a principal object of the invention to accurately control, during the printing, the character pitch between successive characters in a serial printer.

It is a further object of the invention to coordinate the electrical and electro-mechanical functions of a serial on the fly printer.

SUMMARY OF INVENTION

In accordance with the above enumerated objects and other objects which will become apparent there is described a printing control apparatus for use in printer modules. A guideway is provided that extends transversely through the printer module for conducting on edge a plurality of singly spaced apart documents. A first drive means is provided to move the documents at a first speed and operatively connected thereto is a second drive means which is positioned upstream from the first drive means. The second drive means controls and moves the documents through a print operation at speed slower than the first drive means. Position posteriorly to the second means is a detection means for detecting the presence of a document in the guideway. A printing means, positioned between said drive means and disposed along the guideway, comprises a printing wheel which is mounted for rotation in a plane extending in the direction of document movement and a single print hammer adapted to move the document and a ribbon into contact with the print wheel for printing. Synchronizing the operation of the print hammer, print wheel and document movement is a control means responsive to the speed of the movement of document to control the hammer operation for maintaining the accurate character pitch between successive printed characters.

DETAILED DESCRIPTION

Figure 1:
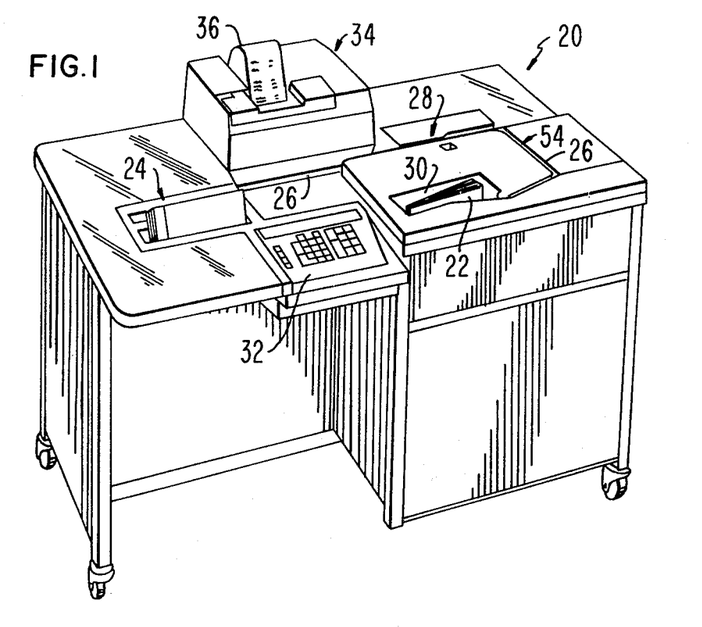
FIG. 1 is a perspective view of a document printing machine incorporating the printer described herein.

Referring to the Figs. by the characters of reference, there is illustrated in FIG. 1 a document printing machine 20 such as found in the banking industry. The documents 22, which may be checks or other similar types of documents, are placed by the operator into the feeding station 24 at the inlet to a document guideway 26. The documents 22 are transported along the guideway through a printer station 28 and are deposited in a receiving hopper 30. At the printer station 28, the documents are printed or encoded with information that has been previously entered into the keyboard 32. Additionally, there is provided a listing printer 34 to record all of the entries made into the keyboard on a listing tape 36. An example of the type of operation to be performed by the document printing machine 20 is the encoding along the lower edge of a check 22, information such as amount and account number in MICR or OCR characters. In such an operation the location of the encoding on the document must be within a predefined area and for this reason the document 22 is driven along its lower edge against the lower plate 37, FIG. 12, of the guideway 26. The spacing or character pitch is held within strict boundaries. The quality of the encoded character must be very high. Putting all of these requirements together, the document printing machine 20 provides for the transport of the documents at two different speeds. The second speed through the printing section provides for the quality and spacing of the printing and the first speed moves the documents out of the print area and into the receiving hopper 30.

Figure 2:
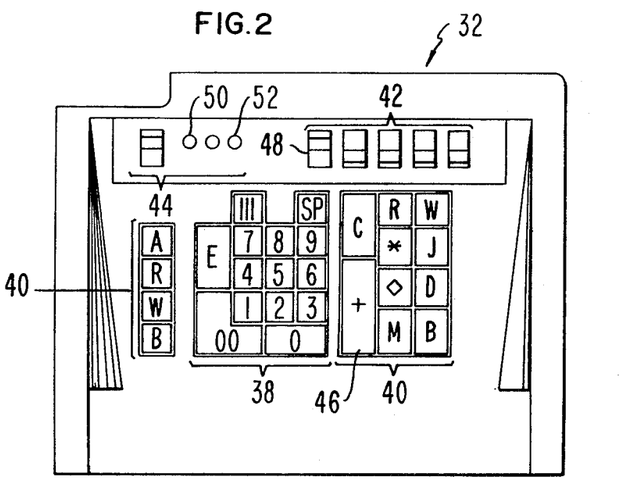
FIG. 2 is a plan view of the keyboard of the document printing machine of FIG. 1.

The keyboard 32, illustrated in FIG. 2, comprises a modified numeric 10-key keyboard 38 and a plurality of operational keys 40. Positioned along the top of the keyboard are a plurality of program keys 42 and operational lights and switches 44. An example of an operational key 40 is the debit key 46 which is used to enter debit amounts into the machine. The operator indexes a numeric amount into the 10-key keyboard 38 and upon completion of that entry depress the debit key 46 causing the amount to be printed on the listing tape 36 and stored within the machine 20 for encoding on the documents 22. The program keys 42 provide for the control of several auxiliary operations to be performed on the document. An example of one such operation is performed by the endorse key 48 which controls an endorse unit to endorse the document 22 as it proceeds along the guideway 26. If the key is deactivated, the endorse unit 54 will not function. Contained within the operational key section 44 are indicators such as the on-off power indication lamp 50, to indicate to the operator whether or not the power is on the machine and an indicator 52 to indicate to the operator when the encoding ribbon is missing in the printer station 28.

Positioned along the guideway 26 between the printer station 28 and the receiving hopper 30 is the endorse section 54 under the control of the endorse key 48. For more detail explanation of an endorsing section as may be used, see U.S. Pat. application Ser. No. 835,145 filed on June 20, 1969, by Harry L. Wallace, entitled Endorsing Apparatus and assigned to the same assignee as this application.

Figure 3:
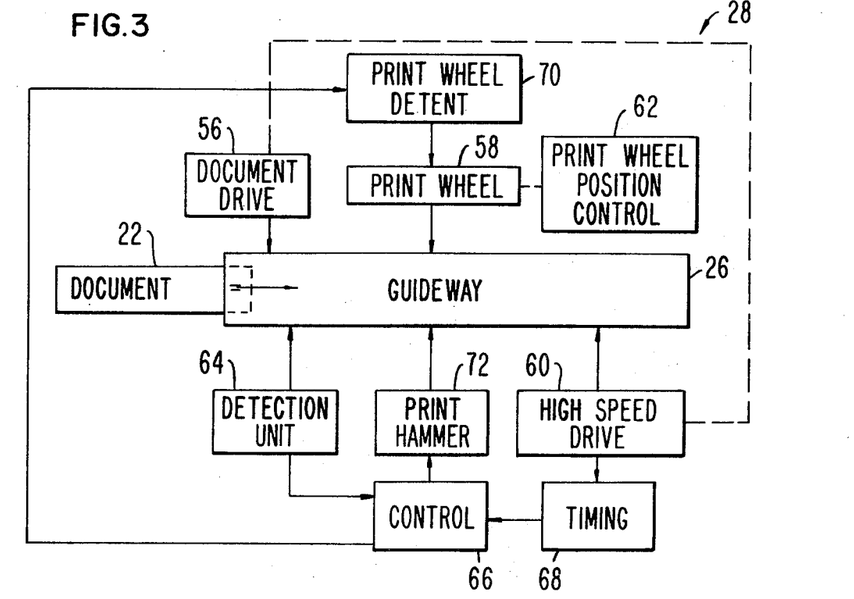
FIG. 3 is a block diagram of the printer module.

Referring to FIG. 3 there is a block diagrammatic view of the printer station 28. A document 22 is moved along the guideway 26 under control of a document drive means 56. The document drive means moves the document 22 pass a print wheel 58 at a document speed, a second speed, consistent with the requirement of quality print. When the document has been printed, the high speed document drive unit 60 will then remove the document from the print station 28 at a much faster speed, a first speed, to convey the document to the endorse section 54. In the preferred embodiment, the document drive 56 moves the document at a rate of 2½ inches per second for printing and the document high speed drive moves the document at 75 inches per second. As previously mentioned, the print wheel is responsive to the keyboard 32 for the printing of information on the document. The print wheel position control unit 62 synchronizes and correlates the entry on the keyboard 32 with the print position of the print wheel 58. For more detailed explanation of the print wheel position control unit reference is made to U.S. Ser. No. 812,006, entitled A Servo System For A Motor, filed on Apr. 1, 1969, by Jack Beery and assigned to the same assignee as this application.

As previously indicated, when the document enters the guideway portion of the printer station 28, it is placed under control of the document drive 56. A detection unit 64 detects the presence of a document in the guideway 26 and electrically supplies this information to a control unit 66. The control unit responds to a timing unit 68 to select the proper time for activation of the print wheel detent unit 70 allowing the print wheel to position and the operation of the print hammer 72. As will be hereinafter described, the document drive 56 and the high speed drive 60 are mechanically coupled together to maintain the previously mentioned 30 to 1 speed ratio for the movement of the document 22.

Figure 4:
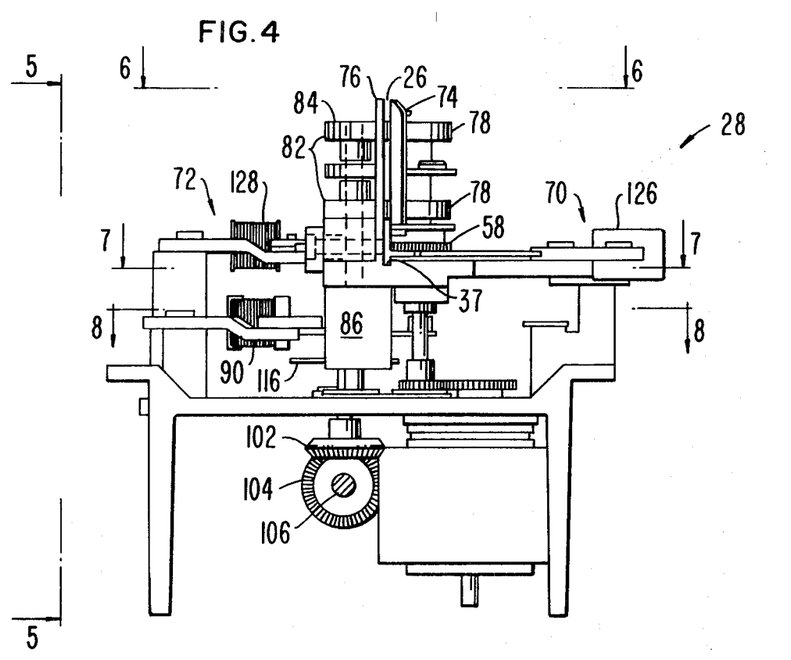
FIG. 4 is a side elevation of the printer module.
Figure 5:
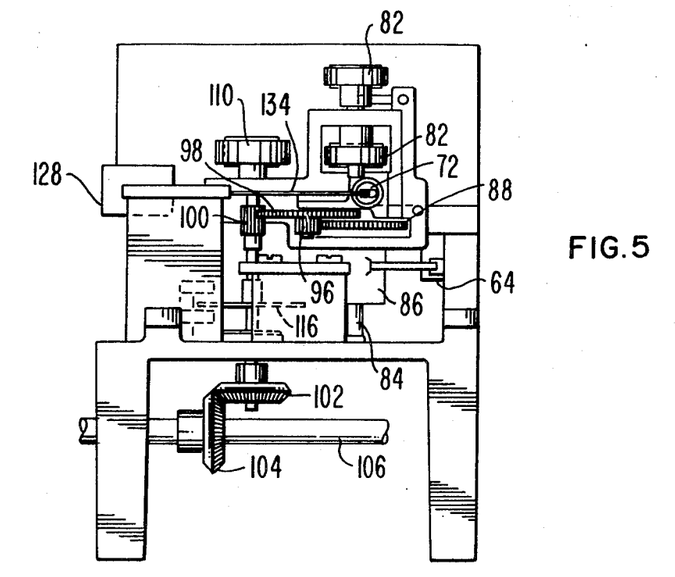
FIG. 5 is a rear elevation of the printer module taken along line 5—5 of FIG. 4.
Figure 6:
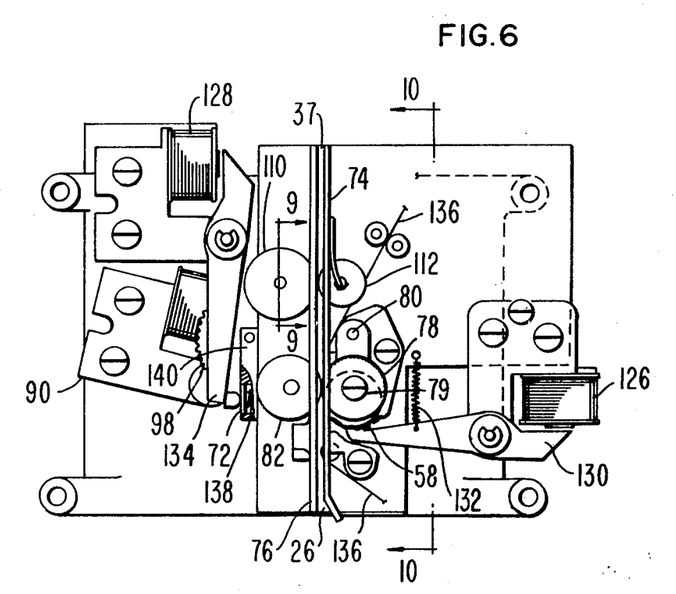
FIG. 6 is a plan view of a printer module taken along line 6—6 of FIG. 4.
Figure 7:
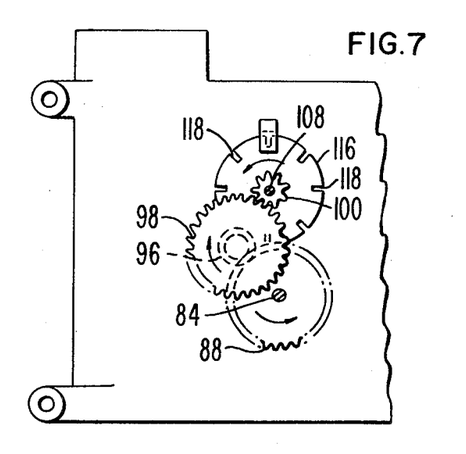
FIG. 7 is a partial sectional view taken along line 7—7 of FIG. 4 illustrating the drive interconnections.

Referring to FIG. 4, there is illustrated a left hand view, with reference to FIG. 1, of the print station 28. The document 22 travels along the guideway 26 between the pair of parallel spaced apart guide plates 74 and 76. When the document enters the guideway 26, it is stopped by a pair of abutting wheel units which are the document drive 56 unit. At this time the document drive unit functions as a gate preventing further drive of the documents down the guideway. Extending through the guide plate 74 are a pair of idler wheels 78 spaced along shaft 79, which are pivotable around the shaft 80, FIG. 6. Diametrically opposed and in contact with each idler wheel 78 are a pair of drive wheels 82. The drive wheels 82 are axially spaced apart along the shaft 84 which is coupled through a clutch 86 to the gear 88, FIG. 5. The clutch 86 is a conventional spring clutch which is operated by the solenoid 164. The drive power received by the gear 88 is coupled to the shaft 84 through the operation of a clutch 86.

Figure 8:
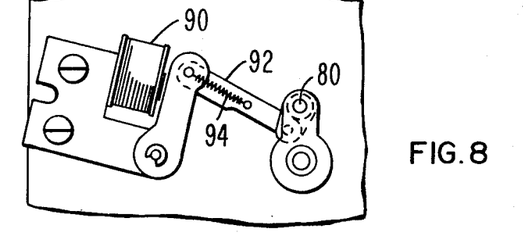
FIG. 8 is a partial sectional view taken along line 8—8 of FIG. 4 showing the idler solenoid mechanism.

The idler wheels are moved into contact with the drive wheels under the control of the solenoid 90. When the solenoid is operated, the idler wheels 78 are pivoted around the shaft 80 into the guideway 26. The linkage mechanism 92 for the idler wheels 78, as illustrated in FIG. 8, is a broken joint linkage wherein the idler roller is free to move away from the drive roller when a document passes therebetween. When the solenoid 90 is de-energized, the spring 94 urges the idler rollers to pivot out of the guideway 26.

The gear 88 is coupled through a gear train comprising gears 96, 98, 100, 102 and 104 to the main power drive shaft 106 for the printer station 28. The drive shaft 106 is connected to a source of power such as a motor which is not shown and provides among other functions the power to move the document along the guideway 26.

Figure 9:
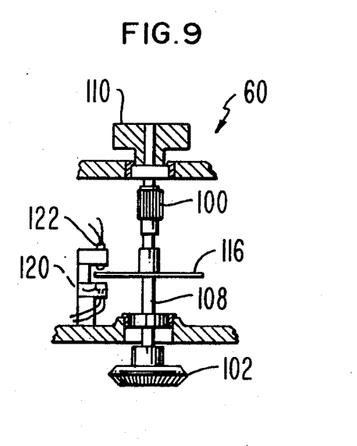
FIG. 9 is a partial sectional view taken along line 9—9 of FIG. 6 showing the timing unit.
Figure 10:
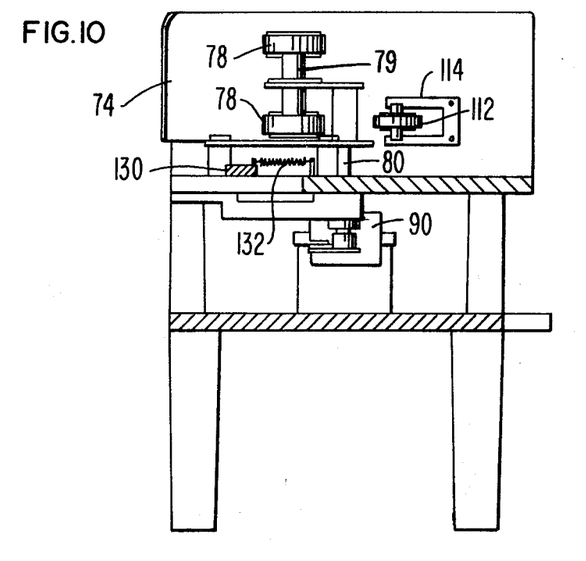
FIG. 10 is a sectional view taken along line 10—10 of FIG. 6 showing the idler wheels.

The two gears 100 and 102 are connected on the main drive shaft 108 for the high speed drive unit 60. In addition to the drive shaft 108, the high speed drive unit, as illustrated in FIG. 9, comprises a smooth low friction drive roller 110 which extends into the guideway 26 through the guide plate 76. Diametrically opposite the drive roller 110 is a spring biased idler roller 112. The spring 114 biases the idler roller into contact with the periphery of the drive roller 110. In the preferred embodiment, the drive roller 110 is rotating at a speed of 1,200 rpm which when applied to a document positioned between the roller 110 and its idler wheel 112 will move the document at linear speed of 75 inches per second. The document drive shaft 84 rotates at a speed of 48 rpm which when applied to a document positioned between the drive rollers 82 and the idlers 78 will drive a document at linear speed of 2½ inches per second. The gearing system 88, 96, 98 and 100 function to maintain this document speed ratio of 30:1 between the document drive means 56 and the high speed document drive unit 60.

The drive wheel 110 and its corresponding idler wheel 112 are basically smooth low friction surfaced wheels which will grip and move a document that is not being held or controlled by any other wheel. The drive wheels 82 are coated with a layer of a tungsten carbide material to provide a more positive grip on a document which is positioned therebetween. The tungsten carbide is sprayed on the wheels by a detonation-gun process and is not thereafter modified. The idler wheels 78 are coated with a rubber composition to reduce the slippage between the drive wheels, the document and the idler wheels. Thus, when the document is under the control of the document drive 56, the high speed drive 60, which is constantly rotating, will slip on the document and will not control or affect the speed of the document moving through the printer station 28. Also, the high speed drive 60 will not damage any documents passing therebetween.

Figure 12:
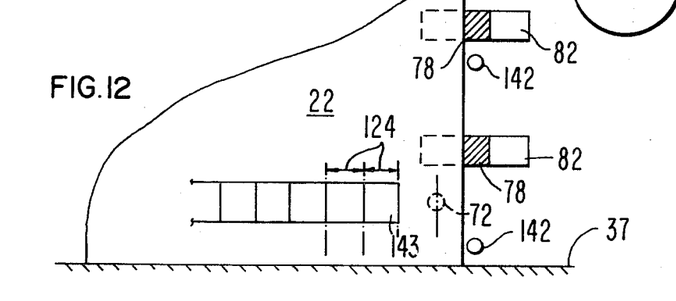
FIG. 12 is a view taken along line 12—12 in FIG. 11 showing the relationship between the document edge cells and the document drive rollers.

Secured to the shaft 108 is a slotted timing disk 116 of the timing unit 68. Equally and angularly spaced along the periphery of the disk are a plurality of slots 118 which are rotated between a solar cell 120 and its corresponding lamp 122. The disk 116 is non-transparent and in the absence of a slot, the light energy from the lamp 122 is not received by the solar cell 120. As a disk rotates and a slot 118 is axially aligned between the lamp 122 and the solar cell 120, the light energy from the lamp activates the cell generating an electrical signal therefrom. In the preferred embodiment, there are eight equally spaced slots 118 about the periphery of the disk 116. The rotational speed of the shaft 108 is such that for each revolution of the disk 116, a document under the control of the document drive 56 is moved one character pitch 124, as illustrated in FIG. 12. Therefore, with the eight slots along the periphery of the timing disk will effectively divide each character pitch into eight equal time intervals. As will hereinafter be shown, these eight equal time intervals provide the control for the printing station 28 during a print operation.

Printing upon a document 22 involves the operational cooperation between the document drive unit 56, the print wheel 58 and its position control system 62, the print hammer 72 and the print wheel detent 70. Responding to the timing disk 116, the control unit 66 controls the operation of the detent solenoid 126 and the print hammer solenoid 128. In order to position the print wheel, the detent solenoid is energized moving the detent arm 130 out of engagement with the print wheel 58. At some predetermined later time, the solenoid is de-energerized and the detent arm is returned by the spring 132 into engagement with the print wheel. The function of the print wheel detent is to fixedly and securely hold the print wheel during the printing operation. In the preferred embodiment, it is not the function of the detent arm to position the print wheel as the print wheel position control 62 accurately positions the wheel 58. Once the print wheel 58 is positioned to the character to be printed, the hammer solenoid 128 is energized causing the interposer 134 to move the hammer 72. When the interposer is stopped by the solenoid, the hammer 72, moving in free flight, presses the document 22 and the ribbon 136 against the face of the type wheel 58. This causes the character on the type wheel to transfer a predetermined amount of ink from the ribbon onto the document. When the power to the hammer solenoid is removed, the hammer 72 and the interposer are returned to their normal position by a biasing spring 138 located within the print hammer housing 140.

Referring to FIG. 12, there is illustrated the relationship between the drive wheels 82 and the corresponding idler rollers 78 on the document drive 56 and a document 22 which is stopped thereby. The detection unit 64 is illustrated as a pair of solar cells 142, although one solar cell would be sufficient, positioned along a plane passing through the axial centers of the drive wheels 82 and the idler wheels 78. The function of the two solar cells are to sense the leading edge of a document 22 to initiate the operation of the control unit 66. In FIG. 12 there is also illustrated the relationship between the hammer 72 and the detection unit 64. When the leading edge of the document covers both of the solar cells 142, the center line of the hammer is positioned one character pitch from the first character print position 143. This relationship will be hereinafter explained in the description of the operation of the control unit 66. When the document has moved beyond the document drive unit 56, the cells are again uncovered thereby generating an electrical signal ENCODE/ 163 indicating that the document has cleared the document drive unit.

OPERATION

As previously mentioned, the operator of the document printing machine 20 places a document into feeding station 24. The document is conveyed from the feeding station into the guideway 26 to be transported through the printing station 28, the endorsing station 54 and into the receiver hopper 30. In the normal condition, the document drive unit 56 is disconnected from the drive train beginning with the drive shaft 106 by the clutch 86. The idler solenoid 90 is energized holding the idler rollers 78 against the drive rolls 82 forming a closed gate. The high speed drive unit 60 comprising the drive wheel 110 is directly coupled to the main drive shaft 106 and is revolving at approximately 1,200 rpm. Both of the hammer and the detent solenoids are initially de-energized.

With the rotation of the high speed drive shaft 108, a train of timing pulses hereinafter referred to as EMCLK 144 are being generated out of the amplifier 146 in response to the timing disk 116 rotating between the lamp 122 and the solar cell 120. The amplifier 146 is a well known amplifier generating a plurality of square wave pulses in response to changes on the input. In the preferred embodiment, the time between each pulse is 6.25 milliseconds and the width of each pulse is approximately one-half millisecond.

Figure 11:
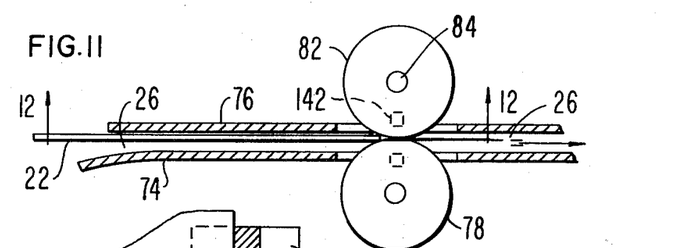
FIG. 11 is an enlarged view of a document engaging the document drive.
Figure 13:
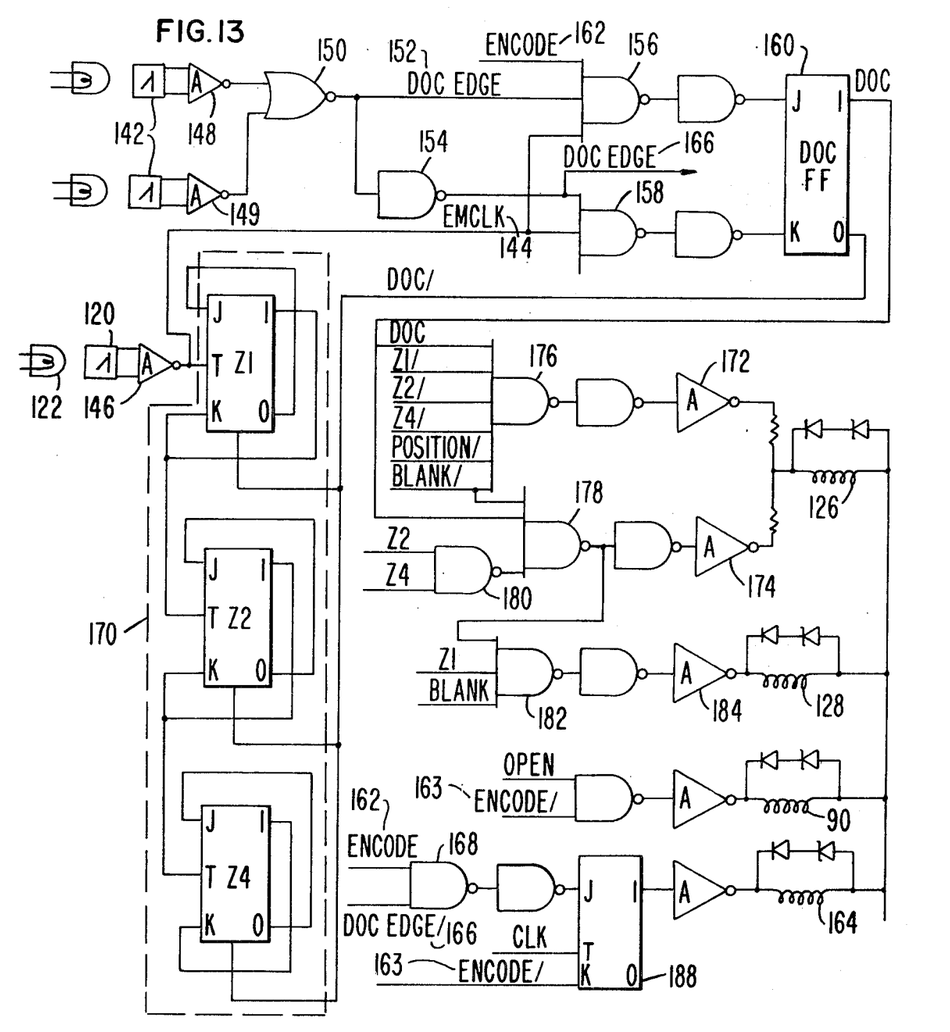
FIG. 13 is a logic schematic diagram of the control unit.
Figure 14:
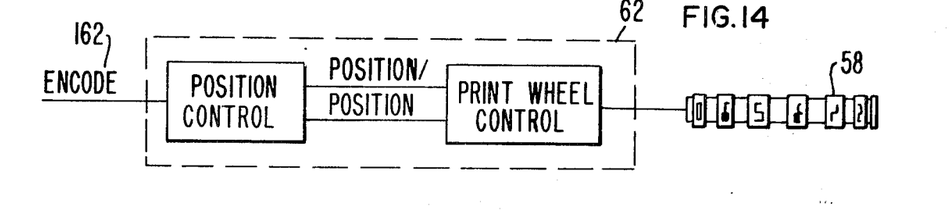
FIG. 14 is a partial block diagram of the print wheel position control unit.

Referring to FIG. 13 which is the schematic of the control unit 66, and taken in conjunction with the timing diagrams of FIG. 15, the operation of the printer station 28 will be explained. All gating with the exception of the NOR gate 150, shown in FIG. 13 are NAND gates and all flip flops are J-K flip flops. The logical true signal is more positive than the logical false signal. The flip flops are switched on a signal change from True to False. The document 22 to be printed is stopped by the gate formed by the document drive unit 56 as shown in FIGS. 11 and 12. Since both of the solar cells 142 are illuminated, the output of their respective amplifiers 148 and 149 are true or positive. These signals are gated together in the NOR gate 150 having an output labeled a document edge, DOC EDGE 152. With either or both inputs to the gate being true, the output, DOC EDGE, is false. DOC EDGE is applied to two NAND gates 154 and 156 generating a true output out of each gate. The output, DOC EDGE/, of the first NAND gate 154 is applied to one input of the NAND gate 158 which functions to control or supply the pulse to the reset side of the document flip flop 160. The true state of the document flip flop 160, DOC, signifies that there is a document in the print station 28 to be printed upon. Conversely, when the flip flop is reset or is false this signifies that there is no document covering the detection unit 64. The other input to the NAND gate 158 is the train of timing pulses EMCLK 144 which provides the switching signal for that gate. When both inputs are true indicating coincidence, the output of the gate is false which is inverted and supplied to the reset input of the flip flop. The output of the NAND gate 150 is also applied to one of three inputs of a NAND gate 156. The second input to that NAND gate is EMCLK 144 signal and the third input is the signal labeled ENCODE 162. The signal encode is defined as indicating that the document 22, as illustrated in FIG. 12, is now ready to be printed upon. For the purpose of discussion ENCODE will be now considered as being true. However, until the document 22 passes between the lamps and the solar cells 142, the document flip flop 160 will not be set due to DOC EDGE.

In order to have the document moves along the guideway 26 the document drive clutch 164 must be energized to couple the drive from the shaft 106 to the drive wheel 82. As illustrated in FIG. 13, the clutch will not be energized when there is a document already being driven through the print station 28. This is evidence by the signal DOC EDGE/. This signal is generated from the NAND gate 154. The ENCODE 162 and DOC EDGE/ 166 are gated in the NAND gate 168 and applied to the J input of the clutch flip flop 170 to energize the clutch solenoid 164. A system timing clock generated from an oscillator which is not shown is applied to the trigger input of a clutch flip flop 170 causing the flip flop to switch when the output of the NAND gate 168 is false. When the flip flop sets, the clutch solenoid 164 is energized and the document drive wheels 82 begin to rotate.

As the document 22 begins to move down the guideway 26, the printing operation must be synchronized with the speed of movement of the document since printing will be accomplished without stopping the document. This synchronization is accomplished through the cooperation of the timing disk 116 in the timing unit 68 and a zone counter 170 in the control unit 66. As previously mentioned, the timing disk contains eight circumference slots equally and angularly spaced around the disk. Also, as previously mentioned, one revolution of the timing disk is equivalent in time to the linear movement of the document 22 one character pitch. Each pulse that is generated from the amplifier 146 is supplied to the zone counter 170 to count the counter when the counter is enabled. The zone counter in the preferred embodiment comprises three J-K flip flops connected as illustrated in form of a ripple counter. The counter counts from zero through seven and automatically resets back to zero. In the preferred embodiment, as illustrated in FIG. 13, the zero output of the document flip flop 160 is applied to the dominate reset input of each flip flop of the zone counter. This will hold the zone counter in the zero state until a document is detected by the solar cells 142.

Figure 15:
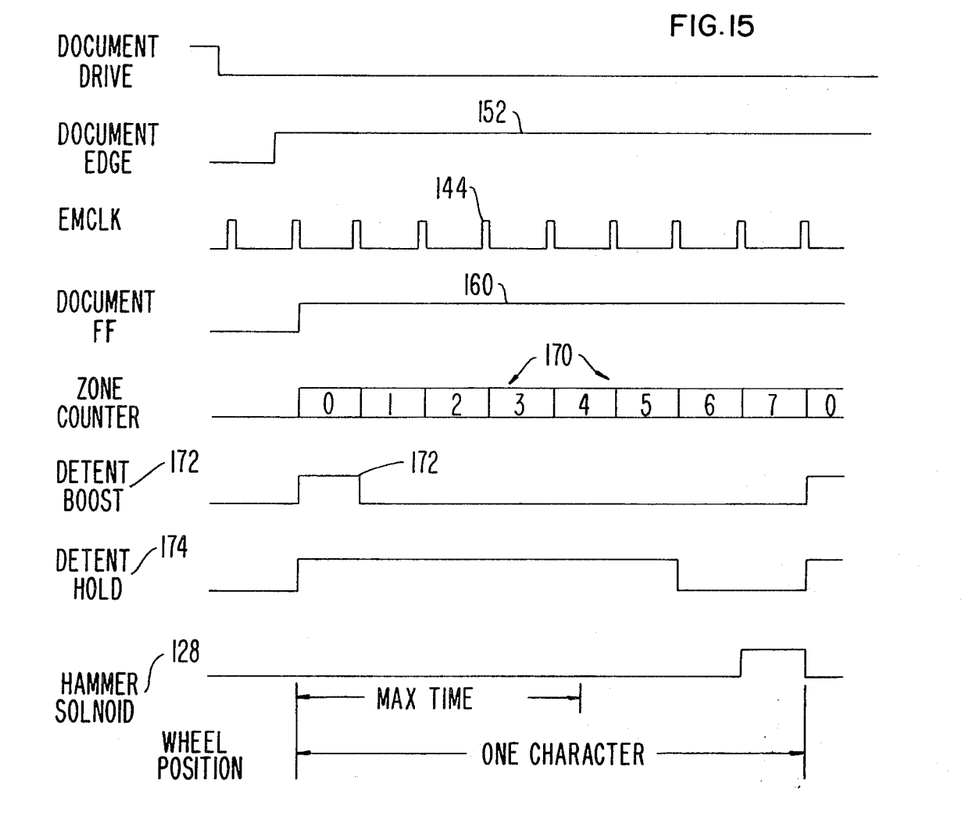
FIG. 15 is a timing diagram of the printer module.

As illustrated in the timing diagram of FIG. 15, when the document drive clutch solenoid 164 is energized, a short time thereafter the document DOC EDGE signal 152 goes true. On the next succeeding EMCLK 144, the document flip flop 160 is driven true and the zone counter 170 is unblocked and until the next EMCLK signal, the zone counter 170 remains at zero. With the zone counter unblocked and at a count of zero both the boost and the hold amplifiers 172, 174 of the detent solenoid are energized removing the detent from the print wheel. With the detent 130 removed, the print wheel control unit 62 will position the print wheel 58 to the next character to be printed. The boost amplifier 172 provides a high power signal to the detent solenoid to energize the solenoid and remove the detent from the print wheel 58. The hold amplifier provides a lower power signal to the detent solenoid to hold the detent solenoid energized at a lower power lever for quick release. The detent hold amplifier 174 will not supply enough power to energize the detent solenoid sufficiently to move the detent.

Referring again to the timing diagram of FIG. 15, the detent boost amplifier 172 receives a pulse only during the zero count time of the zone counter. This is schematically shown in FIG. 13 at the six input NAND gate 176. Reading the function of the inputs from top to bottom, the first input, DOC, indicates that a document is present. The next three inputs indicate that the zone counter is at zero. The fourth input signal, POSITION/ indicates that the print wheel 58 is not in position and the sixth input signal BLANK/, indicates that a character is to be printed. If at this time, the print wheel was in position indicating a repeat of the previous character, the detent would not be removed as the print wheel would not have to be repositioned. Also, if BLANK/ was false, indicating that there will be no printer operation on this character, the print wheel would not be repositioned. The detent hold amplifier 174 is controlled by the NAND gate 178 which is under the timing control of the NAND gate 180. The function of NAND gate 180 is to supply a true pulse until the zone counter reaches a count of six. As illustrated in FIG. 15, the detent hold amplifier is energized count zero of the zone counter 170 through the end of count five of the zone counter. During the count of six in the zone counter 170, the detent mechanism and in particular the detent arm 130 moves into detent position on the print wheel 58. At the beginning of the count of seven, the NAND gate 182 generates a false output which is inverted and applied to energize the hammer amplifier 184. When the hammer amplifier 184 is energized, the hammer solenoid 128 drives the interposer 134 and the hammer 72 driving the document and the ribbon 136 against the print wheel 58. The hammer solenoid is energized for only one count and as soon as the counter returns to a zero count, the hammer solenoid is de-energized. During this operation, the clutch solenoid 164 remains energized moving the document along the guideway. The document continues to move and the next character is presented for printing. During the complete print operation, the document 22 has not been stopped and printing has taken place during movement of the document.

As previously mentioned, in referring to FIG. 12, when the document 22 covers the solar cells 142, the position of the hammer is such that it is one character pitch away from the first character position. This is to allow the previously described timing operation to take place for the first character. As each character is printed, the operation repeats itself for the next sequential character.

As shown in U.S. Ser. No. 812,006, the print wheel position control unit 64 determines the shortest angular rotation of the print wheel 58 between two adjacent printed characters. The maximum angular rotation of the print wheel is 180° and the maximum amount of time for 180° rotation will end when the zone counter is at a count of four. This is indicated on the timing diagram of FIG. 15 where the maximum time for wheel position occurs between a count of zero and half way through the count of four in the zone counter.

When all of the information to be printed on the document 22 has been printed, the ENCODE/ signal 163 is generated causing the idler solenoid 90 to de-energize and the clutch flip flop 188 to become reset. When the idler solenoid is de-energized, the idler 78 is moved away from the drive wheel 82 and the document is then under control of the high speed drive wheel 110 and the idler 112. This causes the document to be moved out of the print station at high speed which, as previously indicated, is a speed of 75 inches per second. As soon as the trailing edge of the document 22 leaves the detection unit, the DOC EDGE signal 152 goes false resetting the document flip flop 160.

There has been shown and described a control system for the printing or encoding of a plurality of sequential characters in line on a document. The spacing or character pitch between adjacent characters is held constant and is independent of the speed at which the document travels through the printing station. The time for moving a document one character pitch is divided into a plurality of zones and wherein in each zone has a particular printer function to be performed. The last zone performs the function of energizing the print hammer printing the selected character. With such a system, if the rotational speed of the main power shaft 106 fluctuates or varies, each zone of the zone counter will synchronously vary in time and the hammer will not fire until the document has moved a distance equal to character pitch length.

What is claimed is:

1. In a document printer, a printing control apparatus comprising:
   a guideway for guiding a plurality of documents singly and on an edge between a pair of parallel spaced apart elongated members,
   first drive means positioned along said guideway for moving each document at a first speed,
   second drive means positioned along said guideway and longitudinally disposed upstream from said first drive means to controllably move each document along said guideway at a second speed, said second drive means operatively driven by said first drive means,
   detection means positioned at said second drive means to detect the presence of a document in said guideway,
   printing means longitudinally disposed along said guideway from said detection means, said printing means including a print wheel mounted along one side of said guideway for rotation in a plane parallel to the direction of movement of the documents, a print hammer diametrically across said guideway from said print wheel, and a print wheel detent for securely holding said print wheel at a selected print character,
   timing means operatively coupled to said first drive means and responsive to the rotational speed thereof to generate a plurality of timing pulses, and
   control means responsive to each of said timing pulses to generate a plurality of control signals at predetermined intervals within a character pitch to control the positioning of the print wheel detent and the operation of the print hammer at consecutive character positions on the moving document.

2. The document printer according to claim 1 wherein said control means is a counter dividing the time of each character pitch into eight equal intervals.

3. The document printer according to claim 1 wherein said first speed is greater than said second speed.

4. The document printer according to claim 3 wherein said first drive means is constantly driving and is subordinate to said second drive means during printing on the document.

5. The document printer according to claim 3 wherein the said first speed is thirty times said second speed.

6. In a document printer a control system for synchronizing the printing with the movement of a document, said control system comprising:
   a document guideway to guide a plurality of sequential documents singly and on edge,
   a first drive means positioned along said guideway to move the documents therealong at a first speed,
   a print wheel positioned along said document guideway for serially printing a plurality of characters on the document at a predetermined character pitch and positioned for rotation in a plane parallel to the movement of the document,
   a print hammer positioned diametrically opposite the face of said print wheel, said hammer operable to move the document against the print wheel for printing,
   a print wheel detent member operable to rigidly hold said print wheel during printing,
   a second drive means operatively coupled to and longitudinally disposed from said first drive means said second drive means operative to move the documents along said guideway between said print wheel and print hammer at a second speed proportional to said first speed,
   timing means operatively connected to said first drive means to generate a plurality of timing pulses synchronously with the movement of the document along said guideway, and
   control means responsive to said timing pulses to divide the character pitch into a plurality of equal intervals for controlling the operation of the print wheel detent and the print hammer.

7. In the document printer according to claim 6 wherein said timing means comprises a wheel having a plurality of radially extending slots equally and angularly spaced along its circumference and a solar cell responsive to said slots to generate eight timing pulses for each character pitch.

8. In the document printer according to claim 7 wherein said control means is a base eight counter for operatively disengaging the print wheel detent from the first through the sixth count and to operate the print hammer at the eight count.

9. In the document printer according to claim 8 wherein said print wheel additionally includes a print wheel positioning control for rotating said print wheel at a maximum 180° prior to the sixth count.

10. In the document printer according to claim 6 wherein said second drive means comprises a clutched drive wheel operatively coupled to said first drive means and a biased idler wheel in operative contact with the periphery of said drive wheel to stop the document thereby and to controllably drive the document along said guideway irrespective of said first drive means.

11. In the document printer according to claim 10 wherein said first drive means drives the document at a greater speed than said second drive means.

* * * * *